(12) United States Patent
Buenz et al.

(10) Patent No.: US 11,193,951 B2
(45) Date of Patent: Dec. 7, 2021

(54) INDUCTIVE HEATING OF AIR DATA PROBES

(71) Applicant: Rosemount Aerospace Inc., Burnsville, MN (US)

(72) Inventors: Mark Buenz, Prior Lake, MN (US); Greg Allen Seidel, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 151 days.

(21) Appl. No.: 16/678,015

(22) Filed: Nov. 8, 2019

(65) Prior Publication Data
US 2021/0140989 A1     May 13, 2021

(51) Int. Cl.
*G01P 5/165*    (2006.01)
*G01C 23/00*    (2006.01)
*B64D 15/00*    (2006.01)

(52) U.S. Cl.
CPC ............. *G01P 5/165* (2013.01); *B64D 15/00* (2013.01); *G01C 23/00* (2013.01)

(58) Field of Classification Search
CPC ...... G01P 13/02; G01P 13/025; G01P 13/045; G01P 5/02; G01P 5/14; G01P 5/12; G01P 5/165; G01P 5/20; G01P 5/001; G01P 5/06; G01P 5/26; G01P 13/0093; G01P 5/00; G01P 5/16; G01P 5/245; G01P 13/002; G01P 5/005; G01P 5/04; G01P 5/10; G01P 5/24; G01P 13/00; G01P 13/0006; G01P 13/0033; G01P 13/006; G01P 13/0073; G01P 21/025; G01P 5/07; G01P 5/175; G01P 5/18; G01P 5/247; G01P 7/00; F03D 17/00; F03D 80/00; F03D 80/40; F03D 7/00; F03D 7/02; F03D 7/048; F03D 80/50; F03D 80/80; F03D 80/85; F03D 9/25; G01C 23/005; G01C 13/006; G01C 13/008; G01C 17/00; G01C 21/005; G01C 21/203; G01C 5/00; G01N 1/2273; G01N 1/26; G01N 29/024; G01N 15/0227; G01N 1/2208; G01N 21/53; G01N 2291/017; G01N 2291/02836; G01N 2291/02881; G01N 2291/045; G01N 2291/048;
(Continued)

(56) References Cited

U.S. PATENT DOCUMENTS 3,514,999 A   6/1970   Mejean et al.
7,175,344 B2  2/2007   D'Ouince et al.
7,883,609 B2  2/2011   Petrenko et al.
(Continued)

FOREIGN PATENT DOCUMENTS

CN   109683642 A   4/2019
EP   3187882 A1   7/2017
(Continued)

OTHER PUBLICATIONS

Extended European Search Report for European Patent Application No. 20206388.9, dated Mar. 11, 2021, 11 pages.

*Primary Examiner* — Andre J Allen
(74) *Attorney, Agent, or Firm* — Kinney & Lange, P.A.

(57) ABSTRACT

An air data probe includes a faceplate, a body connected to the faceplate, and a heating system comprising a coil, the coil being connected to the faceplate. The coil generates an electromagnetic field that couples with the body to heat the body.

19 Claims, 14 Drawing Sheets

(58) Field of Classification Search
CPC ............. G01N 27/226; G01N 29/0672; G01N 29/262; G01N 29/46; G01N 35/00871
USPC .......................................... 73/170.02–170.15
See application file for complete search history.

(56) References Cited

U.S. PATENT DOCUMENTS

| | | |
|---|---|---|
| 9,469,408 B1 | 10/2016 | Elangovan et al. |
| 10,137,994 B2 | 11/2018 | Hull et al. |
| 10,155,593 B2 | 12/2018 | Burton et al. |
| 10,160,548 B2 | 12/2018 | Dichek et al. |
| 2003/0115948 A1 * | 6/2003 | Rouse .................. G01P 13/025 73/170.02 |
| 2020/0363444 A1 * | 11/2020 | Tillotson ................. G01F 1/588 |

FOREIGN PATENT DOCUMENTS

| | | | | |
|---|---|---|---|---|
| EP | 3376236 A1 | | 9/2018 | |
| EP | 3530936 A1 | * | 8/2019 | ........... F03D 7/0224 |
| GB | 201511041 | * | 8/2015 | ............. G01N 27/14 |
| WO | WO-2020155175 A1 | * | 8/2020 | ............. B64D 15/20 |

\* cited by examiner

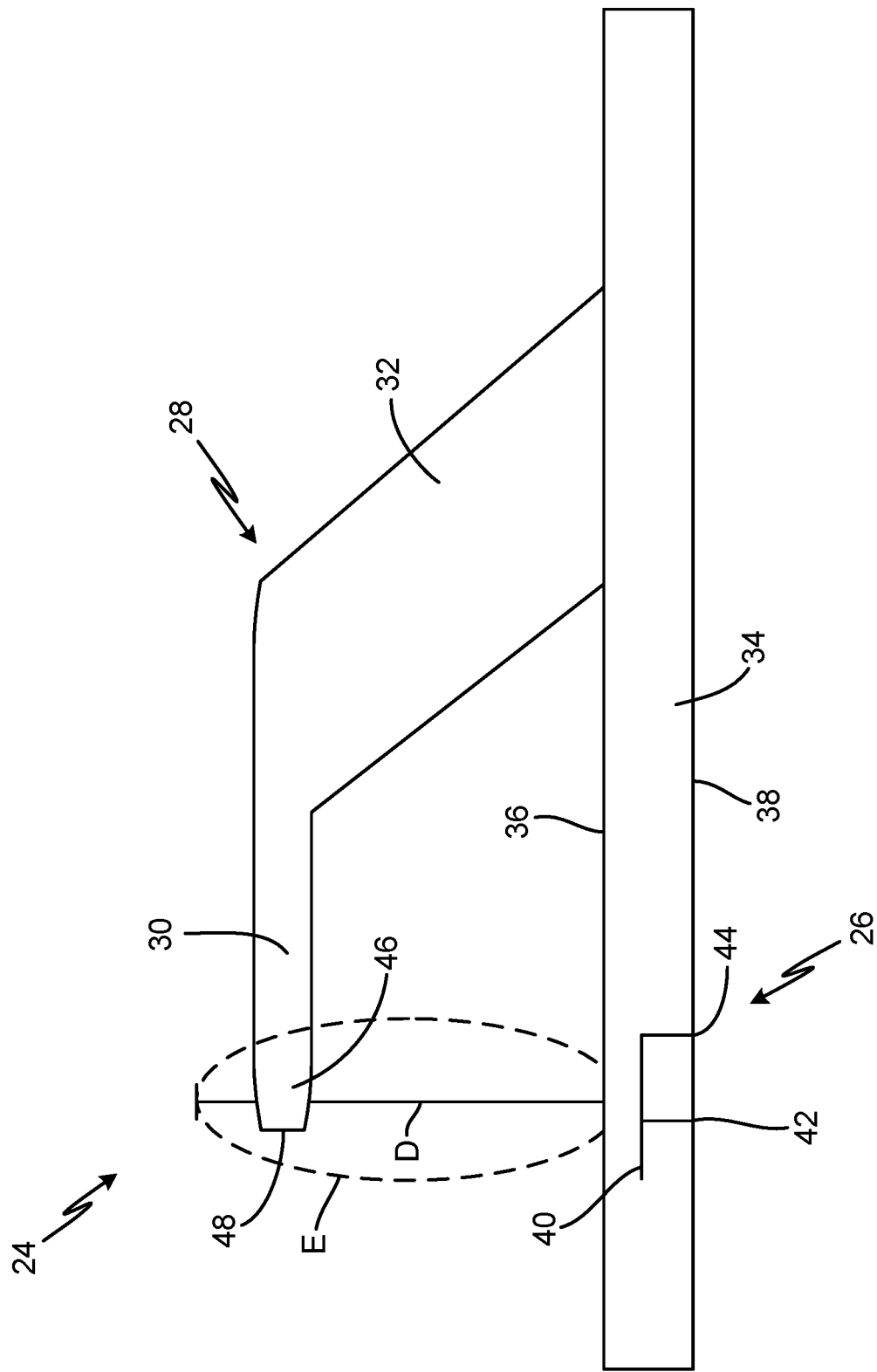

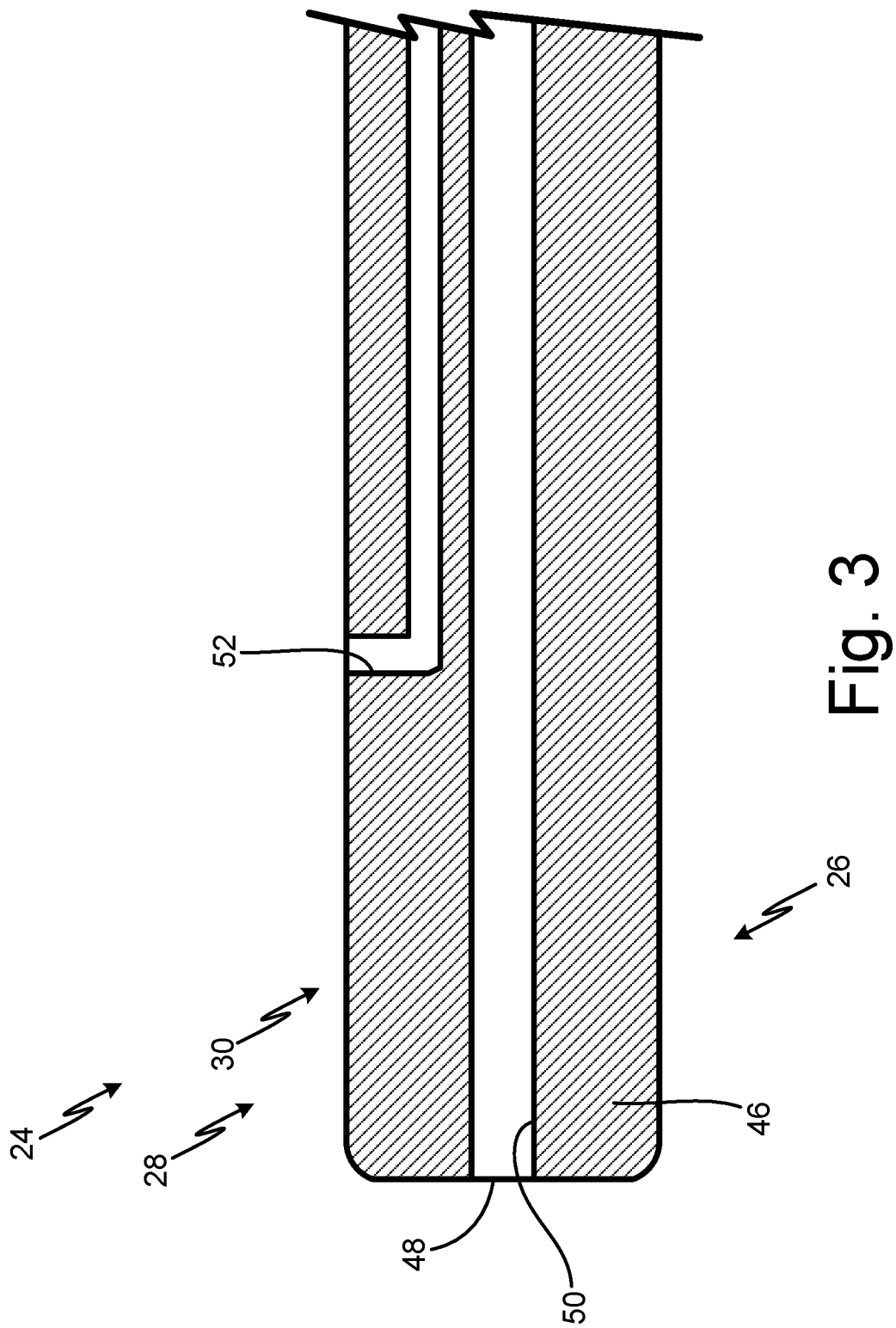

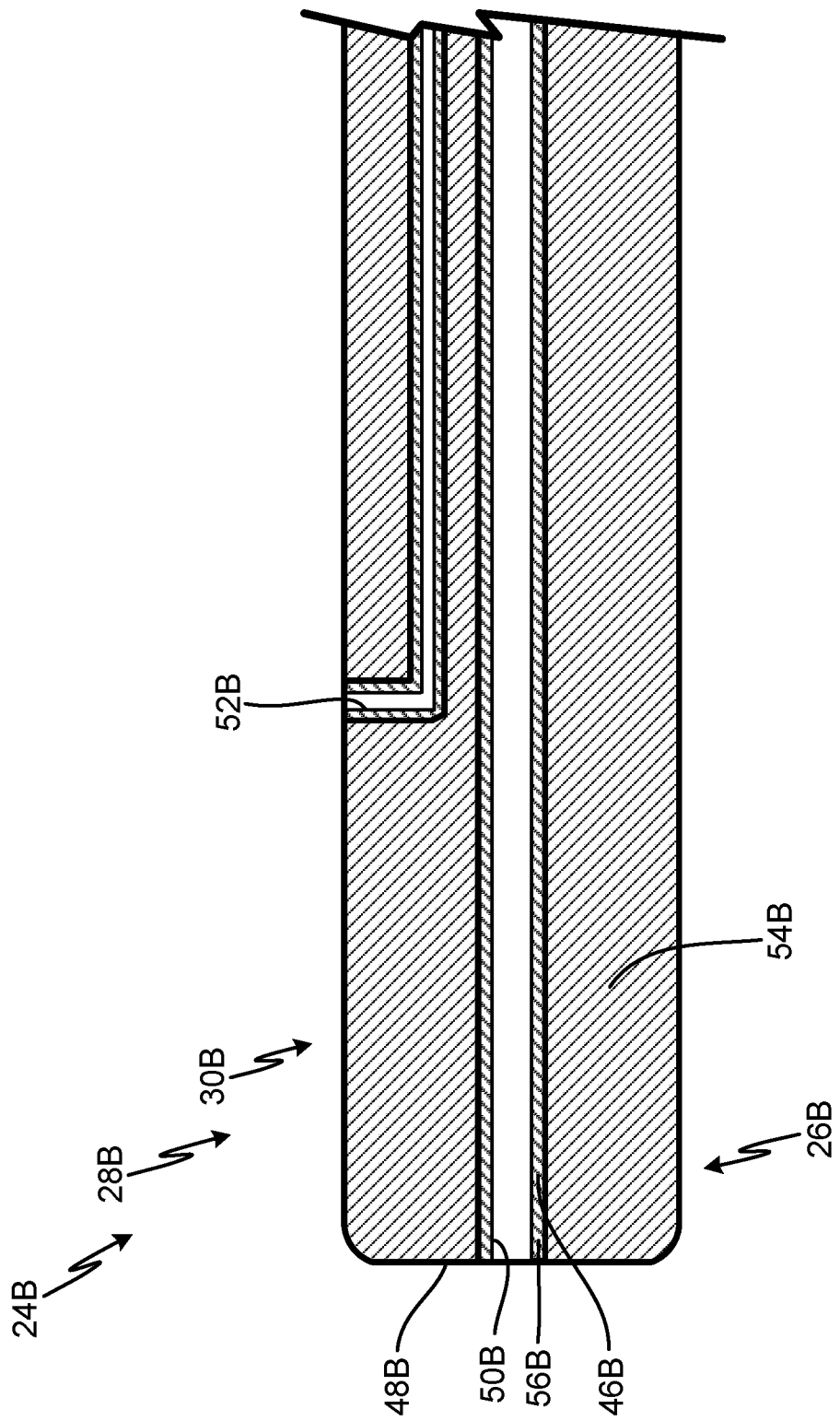

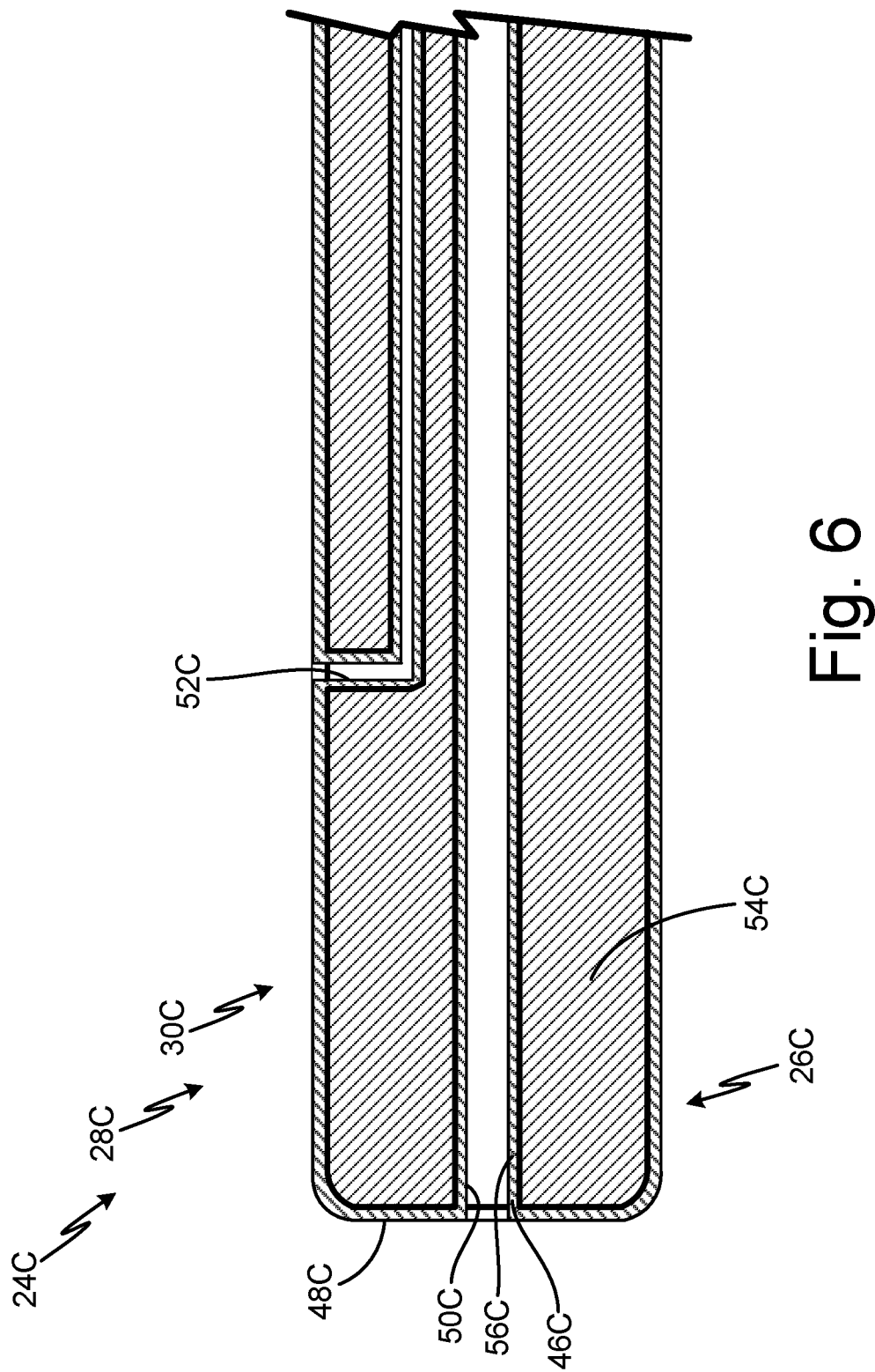

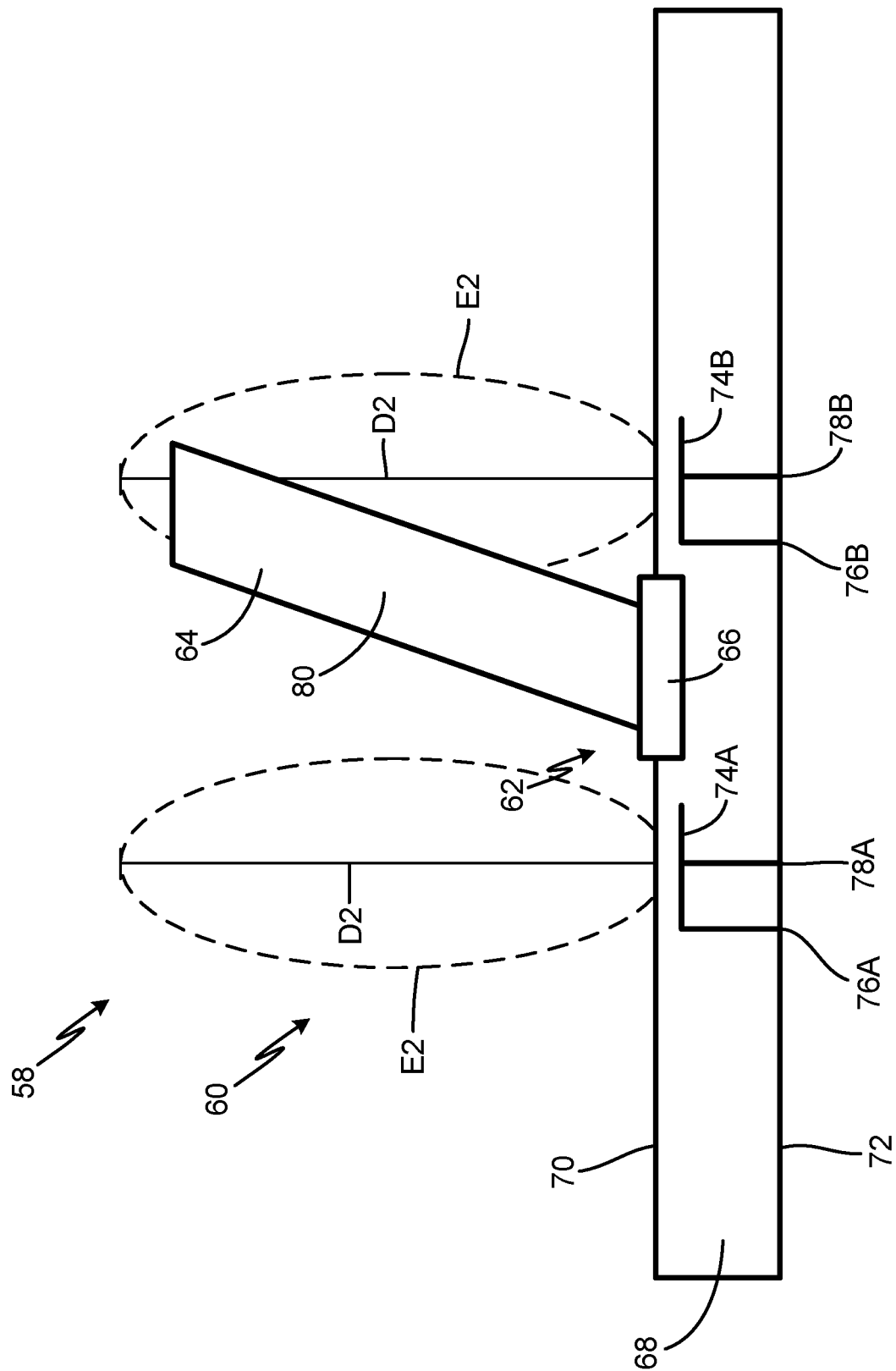

INDUCTIVE HEATING OF AIR DATA PROBES

BACKGROUND

The present disclosure relates generally to air data probes, and in particular, to heating of air data probes.

Air data probes are installed on aircraft to measure air data parameters. Air data parameters may include barometric static pressure, altitude, air speed, angle of attack, angle of sideslip, temperature, total air temperature, relative humidity, and/or any other parameter of interest. Examples of air data probes include pitot probes, total air temperature probes, or angle of attack sensors.

Air data probes are mounted to an exterior of an aircraft in order to gain exposure to external airflow. Thus, air data probes are exposed to the environmental conditions exterior to the aircraft, which are often cold. As such, air data probes must be heated to ensure the air data probes function properly in liquid water, ice crystal, and mixed phase icing conditions. It can be difficult to successfully arrange a heater within the air data probe.

SUMMARY

An air data probe includes a faceplate, a body connected to the faceplate, and a heating system comprising a coil, the coil being connected to the faceplate. The coil generates an electromagnetic field that couples with the body to heat the body.

A method of heating an air data probe includes providing power to a coil connected to a faceplate of the air data probe, generating an electromagnetic field, and producing eddy currents in an interactive material of a body of the air data probe to heat the body, the body being connected to an exterior surface of the faceplate.

BRIEF DESCRIPTION OF THE DRAWINGS

FIG. 2B is a schematic cross-sectional side view of the pitot probe including the heating system.

FIG. 3 is an enlarged partial cross-sectional view of the probe head of the pitot probe.

FIG. 5 is an enlarged partial cross-sectional view of a third embodiment of the probe head of the pitot probe.

FIG. 6 is an enlarged partial cross-sectional view of a fourth embodiment of the probe head of the pitot probe.

FIG. 7B is a schematic cross-sectional side view of the angle of attack sensor.

DETAILED DESCRIPTION

In general, the present disclosure describes an air data probe that is heated via induction heating using a coil connected to the faceplate of the air data probe and a material that interacts with the electromagnetic field produced by the coil, which results in more efficient heating of the air data probe, simplifies construction of the air data probe, and allows for the use of more robust materials in manufacturing the air data probe. A body of the air data probe may be made of the interactive material or coated with the interactive material.

Figure 1:
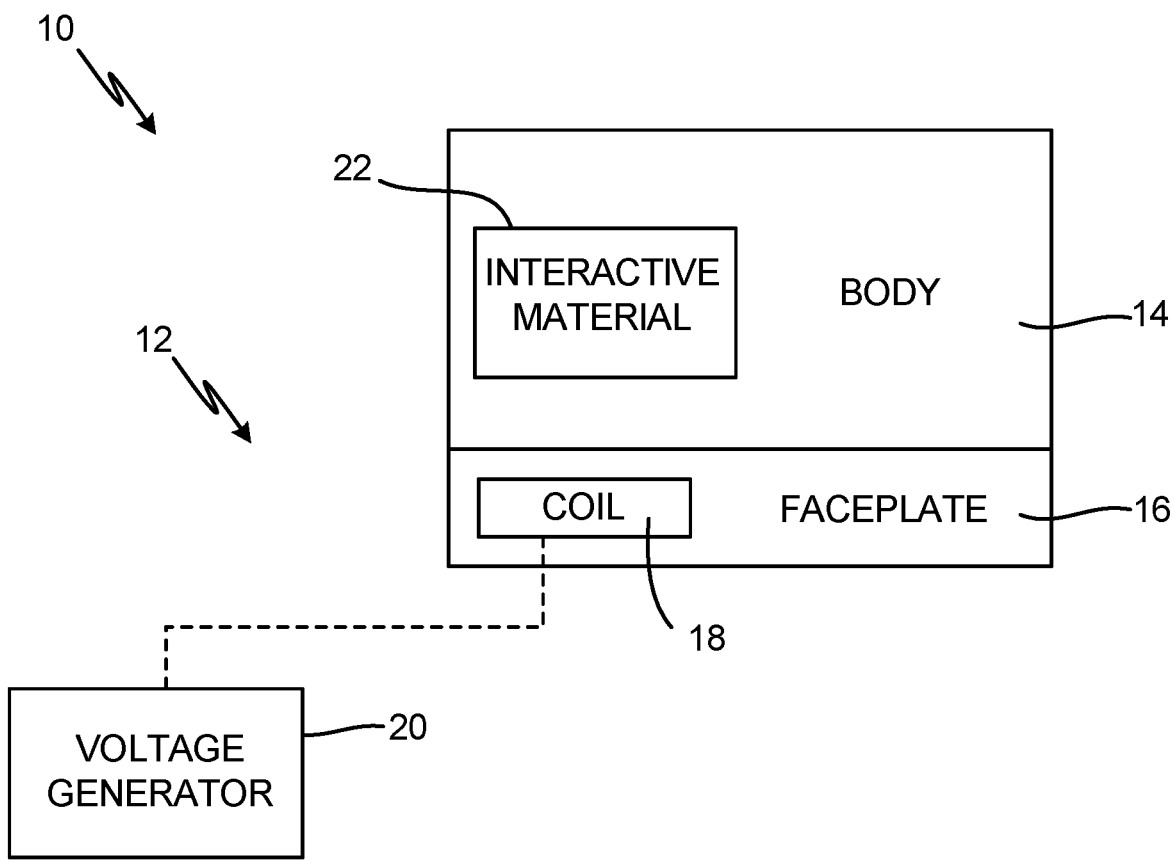
FIG. 1 is a schematic view of an air data probe including a heating system.

FIG. 1 is a schematic view of air data probe 10 including heating system 12. Air data probe 10 includes heating system 12, body 14, and faceplate 16. Heating system 12 includes coil 18, voltage generator 20, and interactive material 22.

Air data probe 10 has heating system 12 to heat body 14 of air data probe 12. A first end of body 14 of air data probe 10 is connected to an exterior surface of faceplate 16. Faceplate 16 makes up a mount of air data probe 10 and is connectable to an aircraft. Coil 18 of heating system 12 is connected to faceplate 16. Coil 18 may be embedded within faceplate 16 or attached to an interior surface of faceplate 16. Coil 18 is electrically connected to voltage generator 20. Voltage generator 20 is the power source of heating system 12. Body 14 of air data probe 10 comprises interactive material 22 of heating system 12. Interactive material 22 may be iron, steel, aluminum, or any other suitable metal that responds to the frequency of a generated electromagnetic field. Body 14 may be made of interactive material 22. Alternatively, body 14 may be made of a material other than interactive material 22, such as ceramic, which is coated with interactive material 22. Faceplate 16 may also comprise interactive material 22.

Air data probe 10 is configured to be installed on an aircraft. Faceplate 16 is mounted to a fuselage of the aircraft via fasteners, such as screws or bolts. Body 14 extends away from the fuselage of the aircraft to be exposed to external airflow. Body 14 interacts with air from surrounding external airflow to generate air data parameters related to the aircraft flight condition.

Heating system 12 inductively heats body 14 of air data probe 10. Voltage generator 20 provides power to coil 18, which generates an electromagnetic field. Coil 18 is connected to faceplate 16, which is in line with the skin of the aircraft, and propagates the electromagnetic field such that the electromagnetic field extends from the skin of the aircraft toward body 14 to reach body 14. The electromagnetic field couples with interactive material 22 of body 14. Interactive material 22 responds to the frequency of the electromagnetic field. Interactive material 22 produces eddy currents in response to the electromagnetic field, which are converted to heat to provide heat to body 14. The eddy currents will directly heat the exterior surface of body 14 first, but the frequency of voltage generator 20 can be varied to get more or less penetration depending on the target area to be heated. Faceplate 16 may also be heated by heating system 12 when faceplate 16 comprises interactive material 22 that couples with the electromagnetic field generated by coil 18. Alternatively, heat generated in coil 18 may provide enough heat to faceplate 16 to keep faceplate 16 free of ice even when faceplate 16 does not comprise interactive material 22.

Body 14 is exposed to moisture and freezing temperatures via the external airflow. As such, heating system 12 prevents ice from forming on body 14 and affecting performance of air data probe 10, allowing air data probe 10 to function properly. Likewise, heating system 12 can prevent ice from forming on an exterior surface of faceplate 16, which is also exposed to external airflow, and interfering with performance of air data probe 10.

Traditionally, air data probes are heated with a heating element, such as a resistance element or wire, inside the body of the air data probe, often heating the body from the inside out and requiring space within the body for the heating element. Further, a resistive heating element is subject to thermal expansion and corrosion that limits the operational life of the heating element. Heating system 12 enables the body 14 to be heated without a heating element within air data probe 10. Body 14 can be heated remotely via the electromagnetic field generated by coil 18 at faceplate 16. As a result, construction of air data probe 10 is simplified, for example, body 14 does not require space for a heating element. Further, body 14 can be heated directly, such as at an exposed exterior surface of body 14 where heat is needed, reducing the amount of power required by air data probe 10 and ensuring heat reaches the desired area.

Figure 7A:
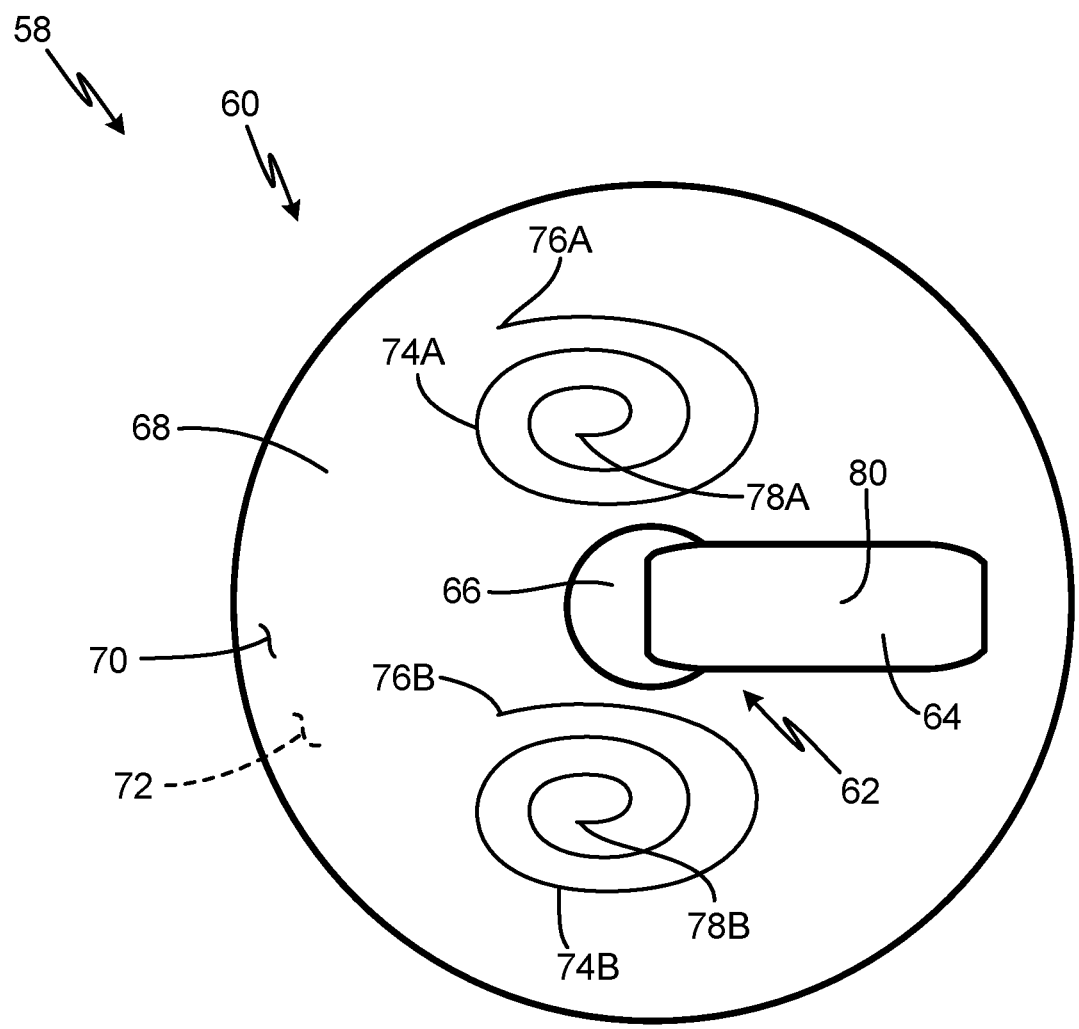
FIG. 7A is a schematic top view of an angle of attack sensor including the heating system.
Figure 7C:
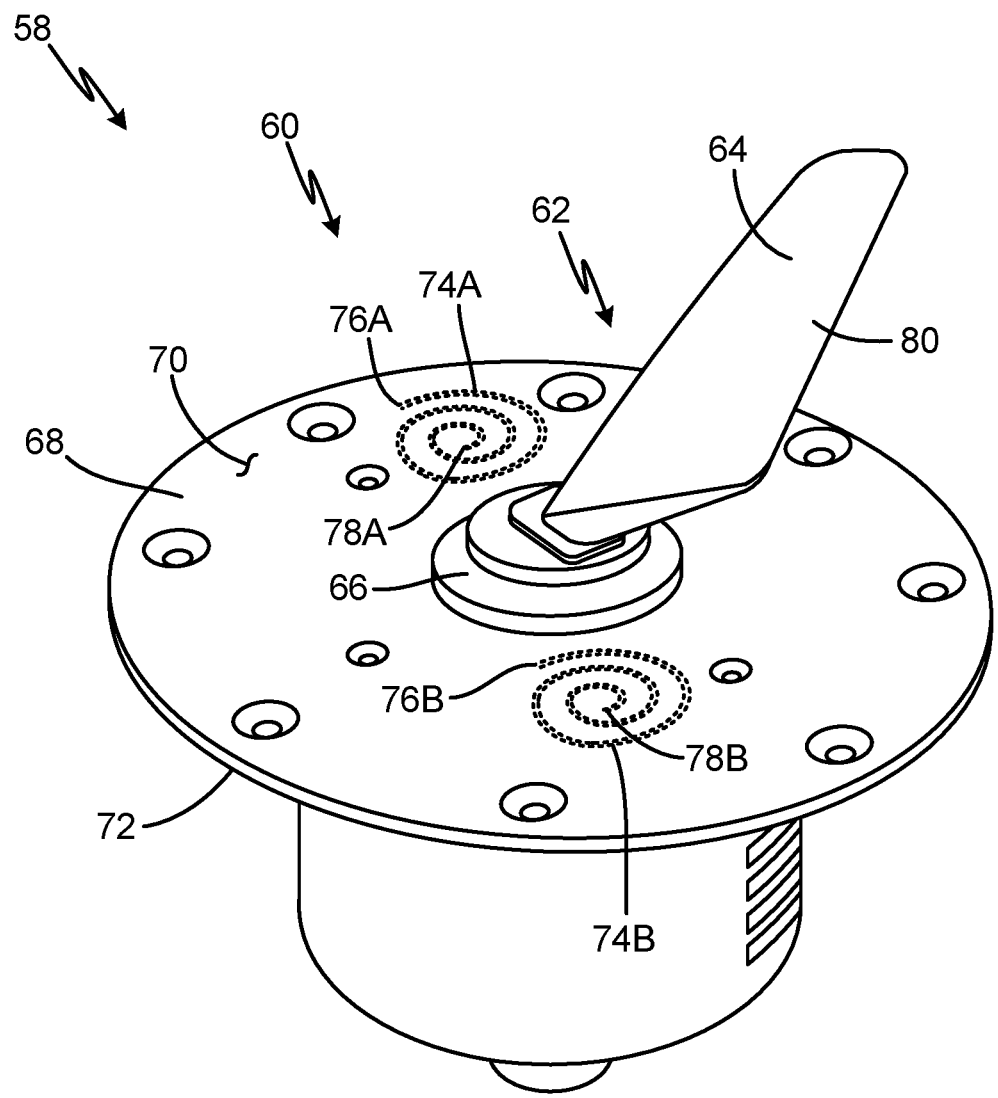
FIG. 7C is a perspective view of the angle of attack sensor.
Figure 8A:
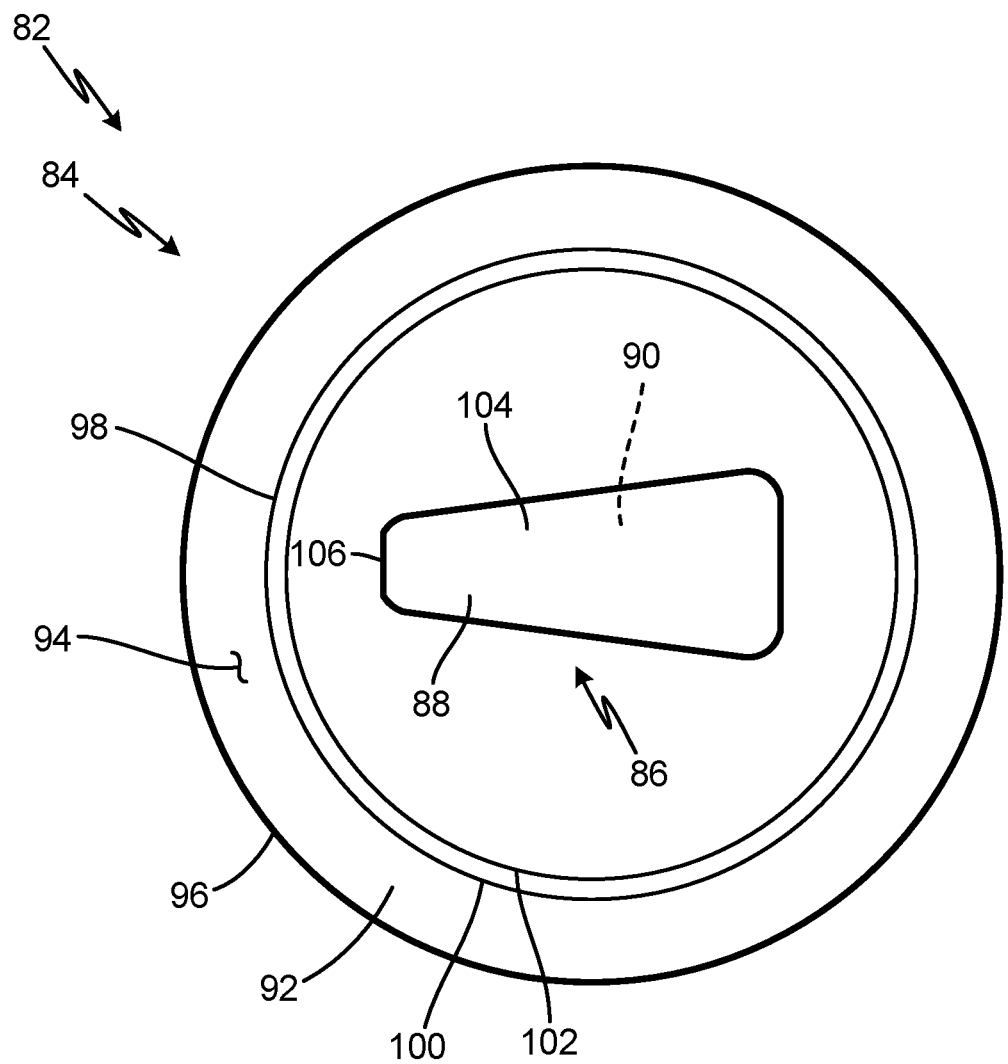
FIG. 8A is a schematic top view of a total air temperature probe including the heating system.
Figure 8B:
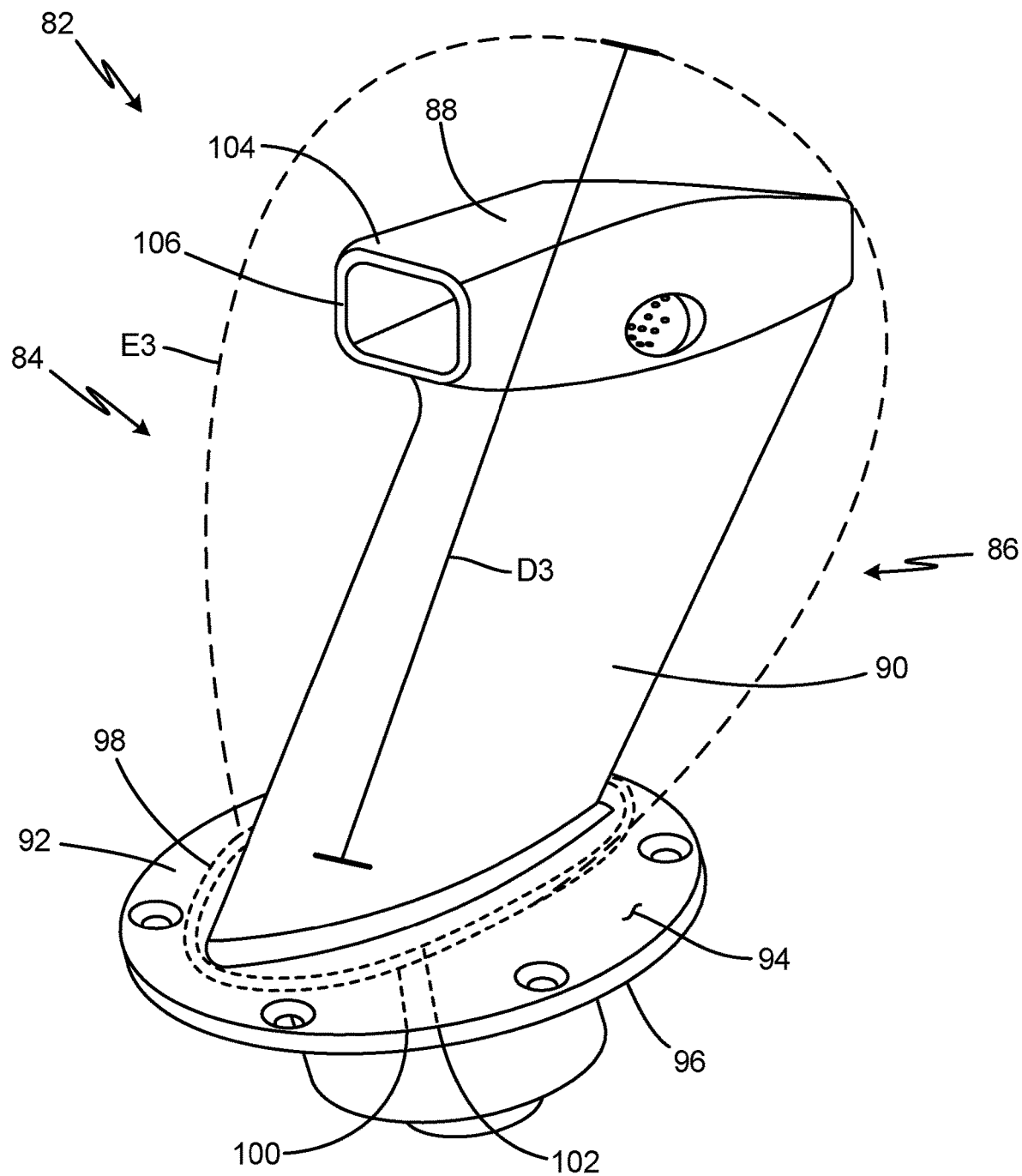
FIG. 8B is a perspective view of the total air temperature probe.

FIGS. 2A-8B illustrate examples of different air data probes 10. In FIGS. 2A-6, a pitot probe is discussed. In FIGS. 7A-7C, an angle of attack sensor is discussed. In FIGS. 8A-8B, a total air temperature probe is discussed. Heating system 12 of the present disclosure can be applied to any suitable air data probe.

Figure 2A:
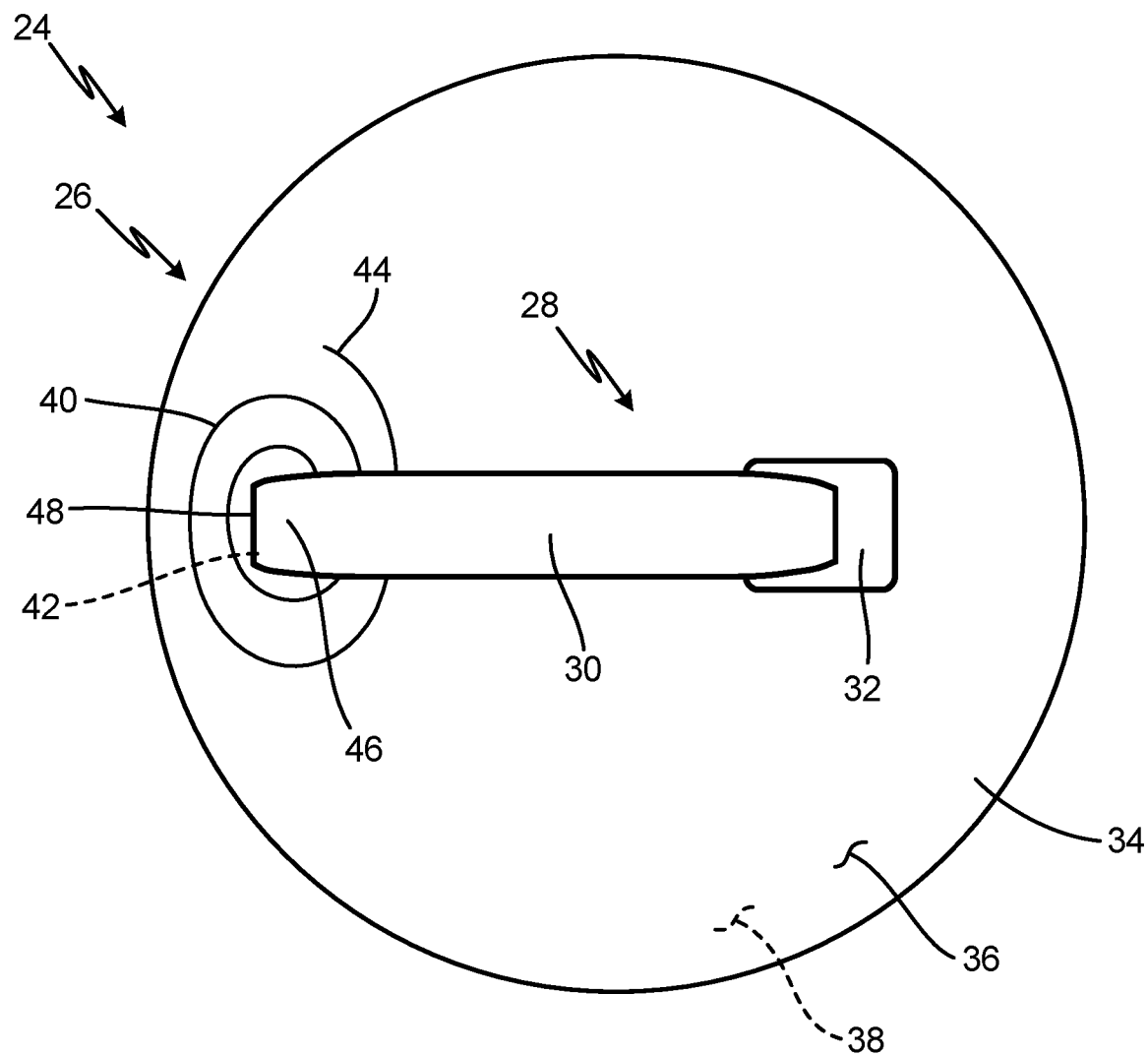
FIG. 2A is a schematic top view of the pitot probe including the heating system.
Figure 2C:
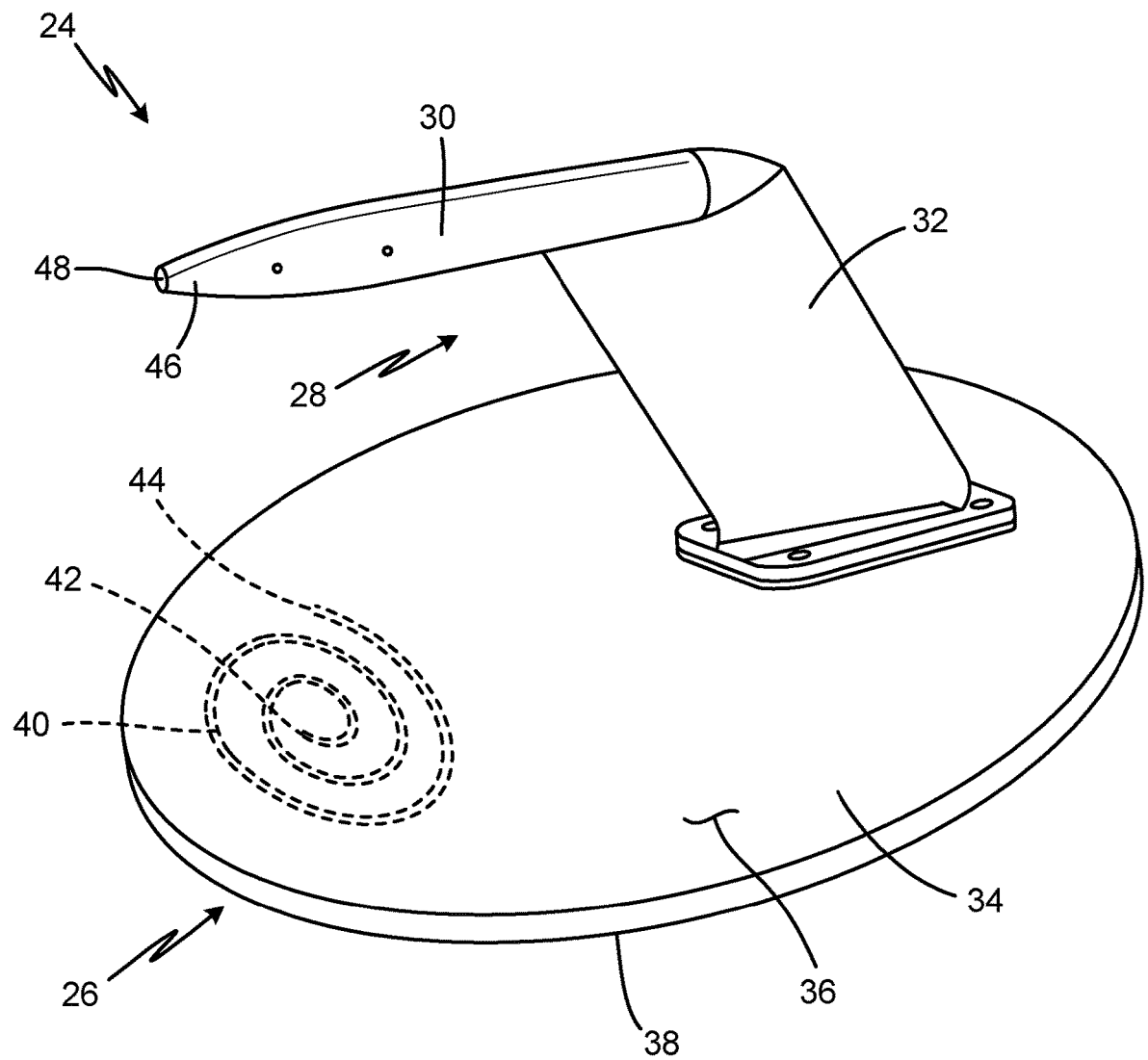
FIG. 2C is a perspective view of a pitot probe including the heating system.

FIG. 2A is a schematic top view of pitot probe 24 including heating system 26. FIG. 2B is a schematic cross-sectional side view of pitot probe 24 including heating system 26. FIG. 2C is a perspective view of pitot probe 24 including heating system 26. FIGS. 2A, 2B, and 2C will be discussed together. Pitot probe 24 includes heating system 26, body 28 (including probe head 30 and strut 32), and faceplate 34 (including exterior surface 36 and interior surface 38). Heating system 26 includes coil 40 (which has first end 42 and second end 44) and interactive material 46. Probe head 30 includes tip 48.

Pitot probe 24 is an example of air data probe 10 described with respect to FIG. 1. Pitot probe 24 has heating system 26 to heat body 28 of pitot probe 24. Body 28 is formed by probe head 30 and strut 32. Probe head 30 is the sensing head of pitot probe 24. Ports are positioned in probe head 30, which is a forward portion of pitot probe 24. Probe head 30 is connected to a first end of strut 32. Strut 32 is blade-shaped. A second end of strut 32 is attached to faceplate 34. Faceplate 34 makes up a mount of pitot probe 24. Faceplate 34 has the same structure and function as faceplate 16 described with respect to FIG. 1. Faceplate 34 also has exterior surface 36 and interior surface 38 opposite exterior surface 36. Exterior surface 36 is exposed to external airflow. A second end of strut 32 is connected to exterior surface 36 of faceplate 34.

Heating system 26 has the same structure and function as heating system 12 described with respect to FIG. 1. Coil 40 is embedded within faceplate 34 between exterior surface 36 and interior surface 38. For example, coil 40 may be placed in a groove within faceplate 34. In alternate embodiments, coil 40 may be attached to interior surface 38 of faceplate 34. For example, coil 40 may be a printed wiring board attached to interior surface 38 of faceplate 34. In this embodiment, coil 40 is positioned within faceplate 34 directly below probe head 30. In alternate embodiments, any number of coils 40 may be connected to faceplate 34 and positioned in any location to provide heat to desired areas of pitot probe 24. Coil 40 has first end 42 at a first end of coil 40 and second end 44 at a second end of coil 40. Coil 40 is in the shape of a flat spiral with first end 42 and second end 44 extending from the flat spiral to terminate at interior surface 38 of faceplate 34. First end 42 and second end 44 are electrically connected to voltage generator 20 (shown in FIG. 1). Body 28 comprises interactive material 46. Interactive material 46 may be iron, steel, aluminum, or any other suitable metal that responds to a frequency of a generated electromagnetic field. Body 28 may be made of interactive material 46 or made of a material other than interactive material 46 and coated with interactive material 46. An entirety of body 28 may be made of interactive material 46. Alternatively, only areas of pitot probe 24 requiring heat may be made of interactive material 46 and areas of pitot probe 24 not requiring heat may be made of material other than interactive material 46. Interactive material 46 may be concentrated at areas of body 28 requiring more heat, such as at tip 48 of probe head 30. Probe head 30 has tip 48 at a forward, or upstream, portion of probe head 14. Tip 48 is at the end of probe head 30 opposite the end of probe head 30 connected to strut 32.

Faceplate 34 is mounted to a fuselage of an aircraft, and strut 32 holds probe head 30 away from the fuselage of the aircraft to expose probe head 30 to external airflow. Heating system 26 inductively heats probe head 30. Heating system 26 may also inductively heat strut 32. Voltage generator 20 (shown in FIG. 1) causes coil 40 to generate electromagnetic field E at a frequency that interacts with interactive material 46. For example, if interactive material 46 is a ferrous material, coil 40 may generate a frequency of at least about 70 kHz. Electromagnetic field E couples with interactive material 46 of body 28. Electromagnetic field E is propagated from coil 40 such that electromagnetic field E extends distance D from exterior surface 36 of faceplate 34. Distance D is about 2.5 inches to about 5.0 inches. In this embodiment, electromagnetic field E extends about perpendicularly from exterior surface 36 of faceplate 34. Because coil 40 is positioned directly below probe head 30, electromagnetic field E extends to probe head 30, and interactive material 46 at probe head 30 responds to the frequency of electromagnetic field E. Interactive material 46 at probe head 30, including at tip 48, produces eddy currents in response to electromagnetic field E, which provides heat to probe head 30 and tip 48.

Heating system 26 heats probe head 30 remotely, with coil 40 remotely located relative to body 28, and without a heating element within body 28. Traditionally, a probe head is constructed with space for implementing a heating element, and it can be difficult to provide heat to the tip, which is directly exposed to moisture and cold temperatures of oncoming airflow. Space constraints within the probe head and the shape of the tip limit how close a heater can get to the external surface and to the tip of the probe head, and conduction is relied on for adequate heating. Heating system 26 simplifies construction of probe head 30 because a heating element does not have to be integrated into probe head 30, and no electrical connection to probe head 30 is needed, allowing probe head 30 to have a thinner, more aerodynamic shape and be made of more robust materials. Heating system 26 also ensures tip 48 is adequately heated. Tip 48 can be heated efficiently without regard to profile.

FIG. 3 is an enlarged partial cross-sectional view of probe head 30 of pitot probe 24. Pitot probe 24 includes heating system 26 and body 28 (including probe head 30). Heating system 26 includes interactive material 46. Probe head 30 includes tip 48, pitot pressure path 50, and static pressure path 52.

Pitot probe 24 has heating system 26 to heat body 28 of pitot probe 24, as described with respect to FIGS. 2A-2C. Body 28 includes probe head 30, which comprises interactive material 46 of heating system 26. In this embodiment, body 28 is made of interactive material 46. As such, probe head 30 is made of interactive material 46, including tip 48, pitot pressure path 50, and static pressure path 52. Pitot pressure path 50 is a channel within body 28 that has an inlet at tip 48 and extends within probe head 30 and strut 32 (shown in FIGS. 2A-2C). Static pressure path 52 is a channel within body 28 that has an inlet an exterior surface of probe head 30 along the length of probe head 30 and extends within probe head 30 and strut 32 (shown in FIGS. 2A-2C). Pitot pressure path 50 and static pressure path 52 are interior surfaces of body 28. As such, interior surfaces of body 28 form pitot pressure path 50 and static pressure path 52.

Pitot pressure path 50 and static pressure path 52 take in air from external airflow to generate air data parameters. Because body 28 is made of interactive material 46, probe head 30, including tip 48, pitot pressure path 50, and static pressure path 52, responds to the electromagnetic field generated by coil 40 (shown in FIGS. 2A-2C). As a result, probe head 30 is heated remotely. Tip 48, pitot pressure path 50, and static pressure path 52 all require heat as all are exposed to external airflow, and thus moisture and cold temperatures. Heating system 26 provides heat directly to tip 48, pitot pressure path 50, and static pressure path 52, ensuring tip 48, pitot pressure path 50, and static pressure path 52 are adequately heated and pitot probe 24 functions properly.

Figure 4:
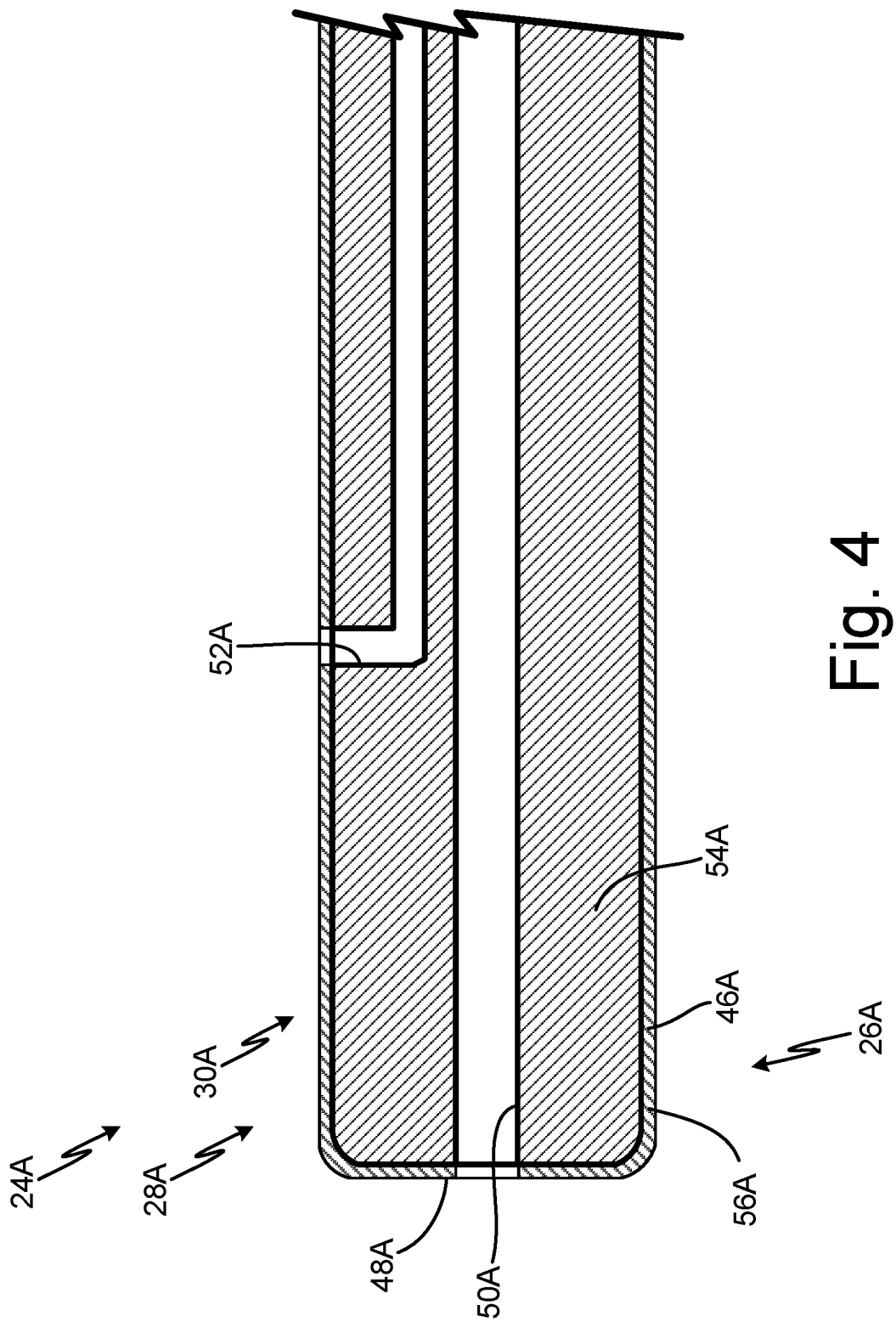
FIG. 4 is an enlarged partial cross-sectional view of a second embodiment of the probe head of the pitot probe.

FIG. 4 is an enlarged partial cross-sectional view of probe head 30A of pitot probe 24A. Pitot probe 24A includes heating system 26A and body 28A (including probe head 30A). Heating system 26A includes interactive material 46A. Probe head 30A includes tip 48A, pitot pressure path 50A, static pressure path 52A, non-interactive material 54A, and coating 56A.

Pitot probe 24A has generally the same structure and function as pitot probe 42 described with respect to FIGS. 2A-3, including heating system 26A and body 28A, which includes probe head 30A. However, probe head 30A of body 28A also comprises non-interactive material 54A and coating 56A, which is interactive material 46A of heating system 26A. A portion of probe head 30A is made of non-interactive material 54A, such as ceramic or any other suitable material that does not respond to the frequency of coil 40 (shown in FIGS. 2A-2C). Coating 56A is positioned on an exterior surface of non-interactive material 54A. As such, coating 56A makes up an exterior surface of probe head 30A. Coating 56A is at tip 48A of probe head 30A and at inlets of pitot pressure path 50A and static pressure path 52A.

Because coating 56A is interactive material 46A, coating 56A couples with the electromagnetic field generated by coil 40 (shown in FIGS. 2A-2C) to produce eddy currents. As a result, tip 48A of probe head 30A and inlets of pitot pressure path 50A and static pressure path 52A, which are exposed to external airflow and require heat, are heated. At the same time, a portion of body 28A is made of non-interactive material 54A, such as ceramic. As such, pitot probe 24A is lighter and more cost-effective with simplified construction while still achieving desired heating capabilities. For example, pitot probe 24A can be additively manufactured with non-interactive material 54A and coated with coating 56A, as the need for incorporating heaters within probe head 30A is eliminated. Constructing pitot probe 24A using non-interactive material 54A also yields more material options for body 28A of pitot probe 24A.

While non-interactive material 54A and coating 56A has been described with respect to probe head 30A, an entirety or other portions of body 28A, including strut 32A, may be made of non-interactive material 54A and coating 56A.

FIG. 5 is an enlarged partial cross-sectional view of probe head 30B of pitot probe 24B. Pitot probe 24B includes heating system 26B and body 28B (including probe head 30B). Heating system 26B includes interactive material 46B. Probe head 30B includes tip 48B, pitot pressure path 50B, static pressure path 52B, non-interactive material 54B, and coating 56B.

Pitot probe 24B has generally the same structure and function as pitot probe 24A described with respect to FIG. 4, except coating 56B is positioned on interior surfaces of non-interactive material 54B. Coating 56B extends from inlets and along interior surfaces of pitot pressure path 50B and static pressure path 52B. As such, coating 56B extends from tip 48B along pitot pressure path 50B.

Because coating 56B is made of interactive material 46B, coating 56B couples with the electromagnetic field generated by coil 40 (shown in FIGS. 2A-2C) to produce eddy currents. As a result, tip 48B of probe head 30B and channels of pitot pressure path 50B and static pressure path 52B, which have inlets exposed to external airflow and require heat, are heated, preventing ice blockages inside pitot pressure path 50B and static pressure path 52B. At the same time, a portion of body 28B is made of non-interactive material 54B, such as ceramic. As such, pitot probe 24B is lighter and more cost-effective with simplified construction while still achieving desired heating capabilities. For example, pitot probe 24B can be additively manufactured with non-interactive material 54B and coated with coating 56B, as the need for incorporating heaters within probe head 30B is eliminated. Constructing pitot probe 24B using non-interactive material 54B also yields more material options for body 28B of pitot probe 24B.

FIG. 6 is an enlarged partial cross-sectional view of probe head 30C of pitot probe 24C. Pitot probe 24C includes heating system 26C and body 28C (including probe head 30C). Heating system 26C includes interactive material 46C. Probe head 30C includes tip 48C, pitot pressure path 50C, static pressure path 52C, non-interactive material 54C, and coating 56C.

Pitot probe 24C has generally the same structure and function as pitot probes 24A and 24B described with respect to FIGS. 4 and 5, except coating 56C is positioned on an exterior surface of non-interactive material 54C and interior surfaces of non-interactive material 54C. As such, coating 56C makes up an exterior surface of probe head 30C. Coating 56C is at tip 48C of probe head 30C and at inlets of pitot pressure path 50C and static pressure path 52C. Coating 56C also extends from inlets and along interior surfaces of pitot pressure path 50C and static pressure path 52C.

Because coating 56C is made of interactive material 46C, coating 56C couples with the electromagnetic field generated by coil 40 (shown in FIGS. 2A-2C) to produce eddy currents. As a result, tip 48C of probe head 30B and inlets and channels of pitot pressure path 50C and static pressure path 52C, which are exposed to external airflow and require heat, are heated. At the same time, a portion of body 28C is made of non-interactive material 54C, such as ceramic. As such, pitot probe 24C is lighter and more cost-effective with simplified construction while still achieving desired heating capabilities. For example, pitot probe 24C can be additively manufactured with non-interactive material 54C and coated with coating 56C, as the need for incorporating heaters within probe head 30C is eliminated. Constructing pitot probe 24B using non-interactive material 54B also yields more material options for body 28B of pitot probe 24B.

While coatings 56A, 56B, and 56C have been described with respect to probe heads 30A, 30B, and 30C in FIGS. 4-6, any part of any type of air data probe can utilize combinations of non-interactive material 54A, 54B, and 54C and coatings 56A, 56B, and 56C to achieve desired heating. Heating can also be tailored by varying the thickness of coatings 56A, 56B, and 56C to control interaction with the electromagnetic field.

FIG. 7A is a schematic top view of angle of attack sensor 58 including heating system 60. FIG. 7B is a schematic cross-sectional side view of angle of attack sensor 58. FIG. 7C is a perspective view of angle of attack sensor 58. FIGS. 7A, 7B, and 7C will be discussed together. Angle of attack sensor 58 includes heating system 60, body 62 (which includes vane 64 and vane base 66), and faceplate 68 (which includes exterior surface 70 and interior surface 72). Heating system 60 includes coils 74A and 74B (which have first ends 76A and 76B and second ends 78A and 78B, respectively) and interactive material 80.

Angle of attack sensor 58 is an example of air data probe 10 described with respect to FIG. 1. Angle of attack sensor 58 has heating system 60 to heat body 62 of angle of attack sensor 58. Body 62 is formed by vane 64 and vane base 66. Vane 64 has a leading edge and a trailing edge, and a first end of vane 64 is connected to vane base 66. Vane base 66 extends within a housing of angle of attack sensor 58 below faceplate 68. Vane 64 and vane base 66 are rotatable. Faceplate 68 has the same structure and function as faceplate 16 described with respect to FIG. 1. Faceplate 68 also has exterior surface 70 and interior surface 72 opposite exterior surface 70. Exterior surface 70 is exposed to external airflow. Faceplate 68 is adjacent to and extends around vane base 66.

Heating system 60 has the same structure and function as heating system 12 described with respect to FIG. 1. Coils 74A and 74B are embedded within faceplate 68 between exterior surface 70 and interior surface 72. For example, coils 74A and 74B may be placed in grooves within faceplate 68. In alternate embodiments, coils 74A and 74B may be attached to interior surface 72 of faceplate 68. For example, coils 74A and 74B may be a printed wiring board attached to interior surface 72 of faceplate 68. In this embodiment, coils 74A and 74B are positioned within faceplate 68 adjacent vane base 66. First coil 74A and second coil 74B are positioned across from each other, such as 180 degrees apart. In alternate embodiments, any number of coils 74 may be connected to faceplate 68 and positioned in any location to provide heat to desired areas of angle of attack sensor 58. Coils 74A and 74B have first ends 76A and 76B at first ends of coils 74A and 74B and second ends 78A and 78B at second ends of coils 74A and 74B, respectively. Coils 74A and 74B are in the shape of flat spirals with first ends 76A and 76B and second ends 78A and 78B extending from the flat spirals to terminate at interior surface 72 of faceplate 68. First ends 76A and 76B and second ends 78A and 78B are electrically connected to voltage generator 20 (shown in FIG. 1). Body 62 comprises interactive material 80. Interactive material 80 may be iron, steel, aluminum, or any other suitable metal that responds to a frequency of a generated electromagnetic field. Body 62 may be made of interactive material 80 or made of a material other than interactive material 80 and coated with interactive material 80. An entirety of body 62 may be made of interactive material 80. Alternatively, only areas of angle of attack sensor 58 requiring heat may be made of interactive material 80 and areas of angle of attack sensor 80 not requiring heat may be made of material other than interactive material 80. Interactive material 80 may be concentrated at areas of body 62 requiring more heat, such as at a leading edge of vane 64, which is an upstream portion of vane 64.

Faceplate 68 is mounted to a fuselage of an aircraft, and vane 64 extends away from the fuselage of the aircraft to expose vane 64 to external airflow. Vane 64 rotates based on the angle at which the aircraft is flying relative to the external oncoming airflow. Vane 64 causes rotation of vane base 66 and a vane shaft, which is connected to vane base 66, within the housing. The vane shaft is coupled to a rotational sensor that measures the local angle of attack or angle of the airflow relative to the fixed aircraft structure. Heating system 60 inductively heats vane 64. Heating system 26 may also inductively heat vane base 66. Voltage generator 20 (shown in FIG. 1) operates at a frequency that causes coils 74A and 74B to generate electromagnetic field E2 with a frequency that interacts with interactive material 80. For example, if interactive material 80 is a ferrous material, coils 74A and 74B generate a frequency of at least 70 kHz. Electromagnetic fields E2 couple with interactive material 80 of body 62. Electromagnetic fields E2 are propagated from coils 74A and 74B such that electromagnetic fields E2 extend distance D2 from exterior surface 70 of faceplate 68. Distance D2 is about 2.5 inches to about 5.0 inches. In this embodiment, electromagnetic fields E2 extend about perpendicularly from exterior surface 70 of faceplate 68. Because coils 74A and 74B are next to, or adjacent, vane base 66, coils 74A and 74B are below vane 64 as it moves in response to external airflow. As such, electromagnetic fields E2 extend to vane 64 when vane 64 is positioned over respective coils 74A and 74B, and interactive material 80 at vane 64 responds to the frequency of electromagnetic field E2 with which interactive material 80 is coupled. Interactive material 80 at vane 64 produces eddy currents in response to electromagnetic field E2, which provides heat to vane 64.

Heating system 60 heats vane 64 remotely, with coils 74A and 74B remotely located relative to body 62, and without a heating element within body 62. Traditionally, it can be difficult to provide heat to the vane and vane base, which are directly exposed to moisture and cold temperatures of oncoming airflow. Space constraints within angle of attack sensor 58 limit how close a heater can get to the external surface of vane 64 and vane base 66, and conduction is relied on for adequate heating. Heating system 60 simplifies construction of vane 64 because a heating element does not have to be integrated into vane 64, and no electrical connection vane 64 and vane base 66 is needed, allowing vane 64 to have a simpler construction and be made of more robust materials. Vane 64 and vane base 66 can rotate without heater wires, reducing the likelihood of damage to angle of attack sensor 58. Heating system 60 also ensures vane 64 and vane base 66 are adequately heated. Vane 64 receives heat directly, which also decreases the amount of power needed to heat vane 64.

FIG. 8A is a schematic top view of total air temperature probe 82 including heating system 84. FIG. 8B is a perspective view of total air temperature probe 82. FIGS. 8A and 8B will be discussed together. Total air temperature probe 82 includes heating system 84, body 86 (which includes head 88 and strut 90), and faceplate 92 (which includes exterior surface 94 and interior surface 96). Heating system 84 includes coil 98 (which has first end 100 and second end 102) and interactive material 104. Head 88 includes inlet 106.

Total air temperature probe 82 is an example of air data probe 10 described with respect to FIG. 1. Total air temperature probe 82 has heating system 84 to heat body 86 of total air temperature probe 82. Body 86 is formed by head 88 and strut 90. Head 88 is connected to a first end of strut 90. Head 88 and strut 90 make up body 86 to total air temperature probe 82. Strut 90 is blade-shaped. A second end of strut 90 is attached to faceplate 92. Faceplate 92 makes up a mount of total air temperature probe 82. Faceplate 92 has the same structure and function as faceplate 16 described with respect to FIG. 1. Faceplate 92 also has exterior surface 94 and interior surface 96 opposite exterior surface 94. Exterior surface 94 is exposed to external airflow. A second end of strut 90 is connected to exterior surface 94 of faceplate 92.

Heating system 84 has the same structure and function as heating system 12 described with respect to FIG. 1. Coil 98 is embedded within faceplate 92 between exterior surface 94 and interior surface 96. For example, coil 98 may be placed in a groove within faceplate 92. In alternate embodiments, coil 98 may be attached to interior surface 96 of faceplate 92. For example, coil 98 may be a printed wiring board attached to interior surface 96 of faceplate 92. In this embodiment, coil 98 is positioned within faceplate 92 surrounding body 86 such that body 86 is in the center of coil 98. In alternate embodiments, any number of coils 98 may be connected to faceplate 92 and positioned in any location to provide heat to desired areas of total air temperature probe 82. Coil 98 has first end 100 at a first end of coil 98 and second end 102 at a second end of coil 98. Coil 98 is in the shape of a flat spiral with first end 100 and second end 102 extending from the flat spiral to terminate at interior surface 96 of faceplate 92. First end 100 and second end 102 are electrically connected to voltage generator 20 (shown in FIG. 1). Body 86 comprises interactive material 104. Interactive material 104 may be iron, steel, aluminum, or any other suitable metal that responds to a frequency of a generated electromagnetic field. Body 86 may be made of interactive material 104 or made of a material other than interactive material 104 and coated with interactive material 104. An entirety of body 86 may be made of interactive material 104. Alternatively, only areas of total air temperature probe 82 requiring heat may be made of interactive material 104 and areas of total air temperature probe 82 not requiring heat may be made of material other than interactive material 104. Interactive material 104 may be concentrated at areas of body 86 requiring more heat, such as at inlet 106 of head 88. Head 88 has inlet 106 at a forward, or upstream, end of head 88.

Faceplate 92 is mounted to a fuselage of an aircraft, and strut 90 holds head 88 away from the fuselage of the aircraft to expose head 88 to external airflow. Heating system 84 inductively heats head 88. Heating system 84 may also inductively heat strut 90. Voltage generator 20 (shown in FIG. 1) operates at a frequency that causes coil 98 to generate electromagnetic field E3 with a frequency that interacts with interactive material 104. For example, if interactive material 104 is a ferrous material, coil 98 generates a frequency of at least 70 kHz. Electromagnetic field E3 couples with interactive material 104 of body 86. Electromagnetic field E3 is propagated from coil 98 such that electromagnetic field E3 extends distance D3 from exterior surface 94 of faceplate 92. Distance D3 is about 2.5 inches to about 5.0 inches. In this embodiment, electromagnetic field E3 extends about perpendicularly from exterior surface 94 of faceplate 92. Because coil 98 surrounds head 88, electromagnetic field E3 extends to head 88, and interactive material 104 at head 88 responds to the frequency of electromagnetic field E3. Interactive material 104 at head 88, including at inlet 106, produces eddy currents in response to electromagnetic field E3, which provides heat to head 88 and inlet 106.

Heating system 84 heats head 88 remotely, with coil 98 remotely located relative to body 86, and without a heating element within body 86. Traditionally, it can be difficult to prevent ice accretion within a total air temperature probe and to provide heat to the inlet, which is directly exposed to moisture and cold temperatures of oncoming airflow. Heating system 84 simplifies construction of body 86 because a heating element does not have to be integrated into body 86, allowing body 86 to be made of more robust materials. Heating system 84 also ensures inlet 106 is adequately heated. Inlet 106 receives heat directly, which also decreases the amount of power needed to heat inlet 106.

Figure 9:
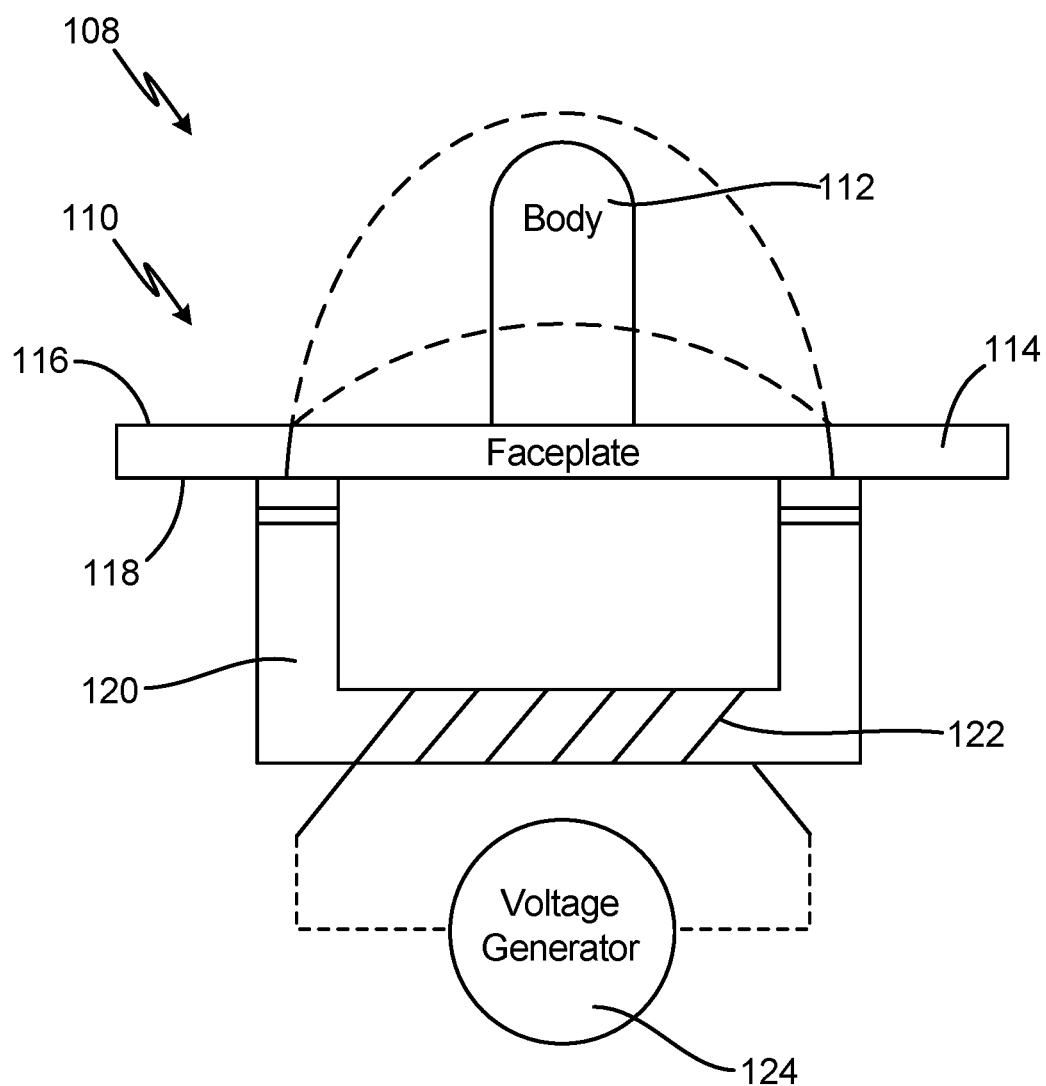
FIG. 9 is a schematic view of an air data probe including a second embodiment of the heating system.

FIG. 9 is a schematic view of air data probe 108 including heating system 110. Air data probe 108 includes heating system 110, body 112, and faceplate 114 (including exterior surface 116 and interior surface 118). Heating system 110 includes magnet 120 (including first end 121A and second end 121B), coil 122, voltage generator 124, and interactive material 126.

Air data probe 108 has heating system 110 to heat body 112 of air data probe 108. A first end of body 112 of air data probe 108 is connected to faceplate 114 at exterior surface 116 of faceplate 114. Faceplate 114 makes up a mount of air data probe 108 and is connectable to an aircraft. Faceplate 114 has exterior surface 116 and interior surface 118 opposite exterior surface 116. Exterior surface 116 is exposed to external airflow. Magnet 120 of heating system 110 is an electromagnet connected to faceplate 114 at interior surface 118. Magnet 120 is shaped such that first end 121A of magnet 120 is connected to interior surface 118 of faceplate 114, and second end 121B of magnet opposite first end 121A of magnet 120 is connected to interior surface 118 of faceplate 114 a spaced distance from first end 121A of magnet 120. For example, as shown in FIG. 9, magnet 120 may be a U-shaped magnet with a flat bottom, a U-shaped magnet, or a magnet of any other suitable shape having first end 121A spaced from second end 121B. Coil 122 of heating system 110 is connected to magnet 120. Coil 122 is connected to magnet 120 between first end 121A and second end 121B of magnet 120, which are connected to interior surface 118 of faceplate 114. Coil 122 is wrapped around the flat bottom portion of U-shaped magnet 120. As such, coil 122 is a 3-dimensional spiral shape. Coil 122 is electrically connected to voltage generator 124. Voltage generator 124 is the power source of heating system 110. Body 112 of air data probe 108 comprises interactive material 126 of heating system 110. Interactive material 126 may be iron, steel, aluminum, or any other suitable metal that responds to the frequency of a generated electromagnetic field. Body 112 may be made of interactive material 126. Alternatively, body 112 may be made of a material other than interactive material 126, such as ceramic, which is coated with interactive material 126. Faceplate 114 may also comprise interactive material 126.

Air data probe 108 is configured to be installed on an aircraft. Faceplate 114 is mounted to a fuselage of the aircraft via fasteners, such as screws or bolts. Body 112 extends away from the fuselage of the aircraft to be exposed to external airflow. Body 112 interacts with air from surrounding external airflow to generate air data parameters related to the aircraft flight condition.

Heating system 110 inductively heats body 112 of air data probe 108. Voltage generator 124 provides power to coil 122 via voltage. As a result, coil 122 supplies power to magnet 120, which generates electromagnetic field E4. Magnet 120 is connected to faceplate 114, which is in line with the skin of the aircraft, and propagates electromagnetic field E4 from first end 121A of magnet 120 to second end 121B of magnet 120 such that electromagnetic field E4 extends from the skin of the aircraft toward body 112 to reach body 112. Electromagnetic field E4 is propagated from magnet 120 such that electromagnetic field E4 extends distance D4 from exterior surface 116 of faceplate 114. Distance D4 is about 2.5 inches to about 5.0 inches. Because body 112 is between first end 121A and second end 121B of magnet 120, electromagnetic field E4 extends to body 112. Electromagnetic field E4 couples with interactive material 126 of body 112. Voltage generator 124 operates at a frequency that causes coil 122 and magnet 120 to generate electromagnetic field E4 with a frequency that interacts with interactive material 126. For example, if interactive material 126 is a ferrous material, coil 122 and magnet 120 generate a frequency of at least 70 kHz. Interactive material 126 responds to the frequency of electromagnetic field E4. Interactive material 126 produces eddy currents in response to electromagnetic field E4, which are converted to heat to provide heat to body 112. The eddy currents will directly heat the exterior surface of body 112 first, but the frequency of voltage generator 124 can be varied to get more or less penetration depending on the target area to be heated. Faceplate 114 may also be heated by heating system 110 when faceplate 114 comprises interactive material 126 that couples with electromagnetic field E4. Alternatively, heat generated by coil 122 may provide enough heat to faceplate 114 to keep faceplate 114 free of ice even when faceplate 114 does not comprise interactive material 126.

Body 112 is exposed to moisture and freezing temperatures via the external airflow. As such, heating system 110 prevents ice from forming on body 112 and affecting performance of air data probe 108, allowing air data probe 108 to function properly. Likewise, heating system 110 can prevent ice from forming on exterior surface 116 of faceplate 114, which is also exposed to external airflow, and interfering with performance of air data probe 108.

Traditionally, air data probes are heated with a heating element, such as a resistance element or wire, inside the body of the air data probe, often heating the body from the inside out and requiring space within the body for the heating element. Further, a resistive heating element is subject to thermal expansion and corrosion that limits the operational life of the heating element. Heating system 108 enables the body 112 to be heated without a heating element within air data probe 108. Body 112 can be heated remotely via electromagnetic field E4 generated by coil 122 and magnet 120 at faceplate 114. As a result, construction of air data probe 112 is simplified, for example, body 112 does not require space for a heating element. Further, body 112 can be heated directly, such as at an exposed exterior surface of body 112 where heat is needed, reducing the amount of power required by air data probe 108 and ensuring heat reaches the desired area. Further, magnet 120 allows for electromagnetic field E4 to achieve a greater distance D4, if desired, as magnet 120 alters the shape of electromagnetic field E4.

Heating system 110 of the present disclosure can be applied to any suitable air data probe, including a pitot probe, angle of attack sensor, or total air temperature probe.

DISCUSSION OF POSSIBLE EMBODIMENTS

The following are non-exclusive descriptions of possible embodiments of the present invention.

An air data probe includes a faceplate; a body connected to the faceplate; and a heating system comprising a coil, the coil being connected to the faceplate; wherein the coil generates an electromagnetic field that couples with the body to heat the body.

The air data probe of the preceding paragraph can optionally include, additionally and/or alternatively, any one or more of the following features, configurations and/or additional components:

The coil is embedded within the faceplate.

The body is attached to an exterior surface of the faceplate, and the coil is attached to an interior surface of the faceplate.

The body comprises an interactive material that couples with the electromagnetic field and produces eddy currents to heat the body.

The interactive material comprises at least one of iron, steel, and aluminum.

The interactive material is a coating on an exterior surface of a portion of the body.

The interactive material is a coating on an interior surface of a portion of the body.

The interior surface forms a channel within the body, the channel being at least one of a pitot pressure path and a static pressure path.

The body is made of the interactive material.

A portion of the body is made of ceramic and the interactive material is a coating on the portion of the body made of ceramic.

The interactive material responds to a frequency of the electromagnetic field.

The coil generates an electromagnetic field to remotely heat the body, the coil being remotely located from the body.

The coil generates a frequency of at least about 70 kHz.

The coil generates an electromagnetic field that extends about 2.5 inches to about 5.0 inches from an exterior surface of the faceplate.

The coil generates an electromagnetic field that also couples with the faceplate to heat the faceplate.

The air data probe is a pitot probe, and the coil is positioned within the faceplate directly below a probe head of the body of the pitot probe.

The air data probe is an angle of attack sensor, a first coil is positioned adjacent a vane base of the body of the angle of attack sensor, and a second coil is positioned adjacent the vane base of the body of the angle of attack sensor across from the first coil.

The air data probe is a total air temperature probe and the coil is positioned to surround the body.

A method of heating an air data probe includes providing power to a coil connected to a faceplate of the air data probe; generating an electromagnetic field; and producing eddy currents in an interactive material of a body of the air data probe to heat the body, the body being connected to an exterior surface of the faceplate.

The method of the preceding paragraph can optionally include, additionally and/or alternatively, any one or more of the following features, configurations and/or additional components:

The interactive material responds to a frequency of the electromagnetic field.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air data probe comprising:
   a faceplate;
   a body connected to the faceplate; and
   a heating system comprising a coil, the coil being connected to the faceplate;
   wherein the coil generates an electromagnetic field that couples with the body to heat the body;
   wherein the body comprises an interactive material that couples with the electromagnetic field and produces eddy currents to heat the body.

2. An air data probe comprising:
   a faceplate;
   a body connected to the faceplate; and
   a heating system comprising a coil, the coil being connected to the faceplate;
   wherein the coil generates an electromagnetic field that couples with the body to heat the body;
   wherein the coil is embedded within the faceplate.

3. The air data probe of claim 1, wherein the body is attached to an exterior surface of the faceplate, and the coil is attached to an interior surface of the faceplate.

4. The air data probe of claim 1, wherein the interactive material comprises at least one of iron, steel, and aluminum.

5. The air data probe of claim 1, wherein the interactive material is a coating on an exterior surface of a portion of the body.

6. The air data probe of claim 1, wherein the interactive material is a coating on an interior surface of a portion of the body.

7. The air data probe of claim 6, wherein the interior surface forms a channel within the body, the channel being at least one of a pitot pressure path and a static pressure path.

8. The air data probe of claim 1, wherein the body is made of the interactive material.

9. The air data probe of claim 1, wherein a portion of the body is made of ceramic and the interactive material is a coating on the portion of the body made of ceramic.

10. The air data probe of claim 1, wherein the interactive material responds to a frequency of the electromagnetic field.

11. An air data probe comprising:
    a faceplate;
    a body connected to the faceplate; and
    a heating system comprising a coil, the coil being connected to the faceplate;
    wherein the coil generates an electromagnetic field that couples with the body to heat the body;
    wherein the coil generates an electromagnetic field to remotely heat the body, the coil being remotely located from the body.

12. The air data probe of claim 1, wherein the coil generates a frequency of at least about 70 kHz.

13. The air data probe of claim 1, wherein the coil generates an electromagnetic field that extends about 2.5 inches to about 5.0 inches from an exterior surface of the faceplate.

14. The air data probe of claim 1, wherein the coil generates an electromagnetic field that also couples with the faceplate to heat the faceplate.

15. The air data probe of claim 1, wherein the air data probe is a pitot probe, and the coil is positioned within the faceplate directly below a probe head of the body of the pitot probe.

16. The air data probe of claim 1, wherein the air data probe is an angle of attack sensor, a first coil is positioned adjacent a vane base of the body of the angle of attack sensor, and a second coil is positioned adjacent the vane base of the body of the angle of attack sensor across from the first coil.

17. The air data probe of claim 1, wherein the air data probe is a total air temperature probe and the coil is positioned to surround the body.

18. A method of heating an air data probe, the method comprising:
    providing power to a coil connected to a faceplate of the air data probe;
    generating an electromagnetic field; and
    producing eddy currents in an interactive material of a body of the air data probe to heat the body, the body being connected to an exterior surface of the faceplate.

19. The method of claim 18, wherein the interactive material responds to a frequency of the electromagnetic field.

* * * * *